Patented Sept. 10, 1940

2,214,037

UNITED STATES PATENT OFFICE 2,214,037

PURIFICATION OF OIL SOLUBLE SULPHONATE

Francis M. Archibald, Elizabeth, N. J., assignor to Standard Oil Development Company, a corporation of Delaware No Drawing. Application January 29, 1938, Serial No. 187,657

10 Claims. (Cl. 260—504)

This invention relates to improvements in purifying oil soluble sulphonates obtained from the treatment of petroleum oils with sulphuric acid and to products obtained thereby.

The oil soluble sulphonates are by-products from the sulphuric acid treatments of lubricating oils or petroleum medicinal white oils. They are also known as mahogany sulphonates or mahogany soaps. In commercial production the most desirable mahogany soaps are obtained as by-products in the manufacture of petroleum medicinal white oils. This is due to the fact that the acid treats in the manufacture of white oils are relatively heavy when compared with the acid treats used in the manufacture of lubricating oils and consequently the soaps produced thereby are of better quality and better yields of the oil soluble sulphonates are obtained for the quantities of material handled. The oil soluble sulphonates are first formed as oil soluble sulphonic acids and are found dissolved in the acid oil layer after the acid sludge separates out at the end of the sulphuric acid treatments of mineral lubricating oil fractions. Traces of oil soluble sulphonic acids are also found occluded in the separated acid sludges. No efforts are made to recover them and the sludges are generally disposed of as waste products. The acid oils also contain sulphur dioxide, some unsettled acid sludge particles and traces of free sulphonic acid in addition to the oil soluble sulphonic acids. The oil soluble sulphonic acids are generally neutralized with alkalies before attempting to finish the white oils, as the oils in the acid condition are very corrosive and difficult to handle. The neutralization of the oil soluble sulphonic acids yields the oil soluble sulphonate soaps and at the same time the neutralization of sulphur dioxide and the free sulphuric acid results in yields of inorganic salts which are recovered in a mixture with the oil soluble soaps.

An object of this invention is to separate the oil soluble sulphonates from the inorganic salts. This purification is desirable where the oil soluble sulphonate soaps are to be used for emulsifying purposes, since the presence of the inorganic salts partially or completely destroys the power of the oil soluble sulphonate soaps to emulsify oil in water, this effect being dependent on the concentration of inorganic salts present. The presence of small amounts of salt makes it necessary to add a large amount of soap to oil in order to make it emulsifiable in water, and a larger amount of salt makes it necessary to add accessory emulsifiers, such as sodium resinate, in order to make it possible to emulsify the oil compound in water.

The acid treatment of a lubricating oil or a petroleum medicinal white oil is carried out by applying the acid in stages, that is, agitating the oil with a relatively small amount of sulphuric acid compared to the whole amount that is to be used, for a short period of time, discontinuing the agitation and allowing the mixture to settle, during which period a sludge drops out as a lower layer and is withdrawn before more sulphuric acid is added and the mixture agitated. The concentration of oil soluble sulphonic acids in the oil increases during the first few stages of the sulphuric acid treatment until it reaches a maximum value, after which stage additional sulphuric acid treatments do not produce more oil soluble sulphonic acids. When this stage is reached, the oil is neutralized and the oil soluble sulphonic acids are removed in the form of a soap.

According to this invention, the acid oil is neutralized with an alkaline salt of a weak acid, such as soda ash, sodium carbonate, or potassium carbonate. An excess of alkali is used to aid in preventing emulsification while extracting the oil soluble sulphonate soap from the oil. The soda ash is added, dissolved in a small amount of water. The presence of free caustic is avoided. At the same time, an alcohol is added as a solvent to dissolve out the oil soluble sulphonate. Methyl, ethyl, isopropyl or other aliphatic alcohols containing not over 4 carbon atoms to the molecule may be used, though the use of isopropyl alcohol is preferred. The concentration of the isopropyl alcohol that is added is about 55% or sufficient so that upon mixing with the water solution of soda ash, it will form an isopropyl alcohol solution of about 50% concentration. Sufficient alcohol is added to obtain an oil soluble sulphonate soap solution of not over 8%. By using an alcohol of this concentration, only a minimum amount of oil will be extracted with the oil soluble sulphonates. The separated alcohol solution of the soap is then concentrated by evaporating off substantially all of the alcohol and part of the water until the salt layer formed by this evaporation has a gravity of about 12° Bé., due to the solution of sodium carbonate, sodium sulphate, and sodium sulphite. The oil soluble sulphonate soaps are partly thrown out of solution in the form of curds. The hot solution of inorganic salts and soap with part of the soap thrown out of solution is then allowed to settle and the aqueous salt layer separated. The separated aqueous solution containing the oil soluble sulphonate soaps partly in solution and partly in suspension in the form of curds is then mixed with isopropyl alcohol of 80 to 90% concentration. The solution obtained in this way must not contain over about 10 to 14% of soap and the final concentration of the alcohol is to be kept between 65 and 80%. This mixture is thoroughly agitated at about 60° C. in order to dissolve all of the soap. The solution is then allowed to settle for a period of 1 to 7 days, during which time a concentrated aqueous salt solution settles out and is withdrawn. The pH of the purified soap solution is maintained below 9.5 according to this process. This is carefully controlled and the solution must not indicate alkalinity when a phenolphthalein indicator is used. Too much water in the solution, insufficient settling or too high a temperature of settling prevents the precipitation of the salt solution containing the alkali and under these conditions the pH will be found to be above 9.5. The separated upper layer of alcoholic soap solution is then withdrawn and the alcohol and water present evaporated and oil is added to increase the fluidity of the soap.

The invention is not to be limited to the specific embodiments shown or the specific examples given, nor to any theories advanced as to the operation of the invention, but in the appended claims it is intended to claim all inherent novelty in the invention as broadly as the prior art permits.

I claim:

1. The process of obtaining purified oil soluble sulphonates from petroleum oils comprising neutralizing an oil that had been treated with concentrated sulphuric acid with an alkaline salt of carbonic acid, extracting the neutralized oil with a 55% aqueous solution of an aliphatic alcohol containing not more than 4 carbon atoms in the molecule, separating the aqueous alcoholic layer solution containing not over 8% of the oil soluble sulphonates, evaporating the aqueous alcoholic solution until an aqueous salt layer is formed having a gravity of about 12° Bé., separating the upper layer and adding thereto a monohydric aliphatic alcohol containing not over 4 carbon atoms in the molecule to obtain an alcohol solution of a concentration between 65 to 80% and containing not over 14% of oil soluble sulphonates dissolved therein, allowing the mixture to settle until the pH of the alcohol layer is below 9.5, separating the upper layer containing the purified soaps and recovering same by evaporating the water and alcohol from the separated alcohol layer to obtain a concentrated oil soluble sulphonate.

2. The process of obtaining purified oil soluble sulphonates from petroleum oils comprising neutralizing an oil that had been treated with fuming sulphuric acid with an alkaline salt of carbonic acid, extracting the neutralized oil with a 55% aqueous solution of an alcohol containing not more than 4 carbon atoms in the molecule, separating the aqueous alcoholic layer solution containing not over 8% of the oil soluble sulphonates, evaporating the aqueous alcoholic solution until an aqueous salt layer is formed having a gravity of about 12° Bé., separating the upper layer and adding thereto a monohydric aliphatic alcohol containing not over 4 carbon atoms in the molecule to obtain an alcohol solution of a concentration between 65 to 80% and containing not over 14% of oil soluble sulphonates dissolved therein, allowing the mixture to settle until the pH of the alcohol layer is below 9.5, separating the upper layer containing the purified soaps and recovering same by evaporating the water and alcohol from the separated alcohol layer to obtain a concentrated oil soluble sulphonate.

3. The process of obtaining purified oil soluble sulphonates from petroleum oils comprising treating the oil with sulphuric acid, separating the sludge formed thereby, neutralizing the acid oil with a salt of carbonic acid and an alkali metal of the class consisting of potassium and sodium, extracting the sulphonate compounds with an aqueous monohydric aliphatic alcohol containing not over 4 carbon atoms to the molecule in a concentration of about 50%, evaporating the extract to obtain an aqueous salt layer having a gravity of about 12° Bé., allowing the solution to settle, separating the precipitated salts, mixing the residual solution with said monohydric aliphatic alcohol to obtain a final concentration of the alcohol of 65 to 80% and a solution containing not over 10 to 14% of the oil soluble sulphonates, allowing the mixture to settle until the said alcoholic layer is no longer alkaline to phenolphthalein, separating the upper layer containing the purified soaps and recovering same by evaporating the residual solution while adding oil to separate the alcohol.

4. The process of obtaining purified oil soluble sulphonates from petroleum oil comprising treating the oil with sulphuric acid, neutralizing with an aqueous solution of sodium carbonate, adding an aqueous solution of isopropyl alcohol of about 55% concentration, separating the alcohol layer, evaporating the alcohol layer until an aqueous solution of about 12° Bé. gravity is formed, allowing the mixture to settle, separating the upper layer and adding thereto sufficient isopropyl alcohol to obtain a solution containing not over 10 to 14% of oil soluble sulphonates in an ispropyl alcohol solution of 65 to 80% concentration, allowing the mixture to settle, separating the upper layer containing the purified soaps and recovering same by evaporating the alcohol layer while adding oil to obtain a purified oil soluble sulphonate.

5. Process according to claim 4 in which temperatures of about 60° C. are used while diluting the concentrated solution of oil soluble sulphonate and temperatures of below 40° C. are used during settling.

6. Process according to claim 4 in which isopropyl alcohol of about 85 to 90% is added to dilute the concentrated soap solution.

7. The process of obtaining purified oil soluble sulphonates which comprises neutralizing a petroleum oil that had been treated with concentrated sulphuric acid with an alkaline salt of carbonic acid, extracting the neutralized oil with a 55% aqueous solution of an alcohol containing not more than 4 carbon atoms in the molecule, separating the alcohol layer containing about 8% of oil soluble sulphonates, evaporating the aqueous alcoholic solution to form an aqueous salt layer of about 12 Bé. gravity, separating the upper layer and adding thereto monohydric aliphatic alcohol containing not over 4 carbon atoms in the molecule to obtain an aqueous alcoholic solution of a concentration between 65 to 80% and containing not over 14% of oil soluble sulphonates dissolved therein, allowing the mixture to settle until the alcoholic layer is no longer alkaline when using phenolphthalein as an indicator, separating two aqueous salt layers and evaporating water and alcohol from the separated alcohol layer.

8. The process of obtaining oil soluble sulphonates according to claim 7 in which an oil is added as the alcohol and water are evaporated from the separated alcohol layer.

9. The process of obtaining purified oil soluble sulphonates according to claim 7 in which the alcohol layer is separated after the pH value is reduced below 9.5.

10. The process of obtaining purified oil soluble sulphonates from petroleum oils comprising neutralizing an oil that had been treated with concentrated sulphuric acid with an alkaline salt of carbonic acid, extracting the neutralized oil with an aqueous solution of not over 55% concentration of an alcohol containing not more than 4 carbon atoms in the molecule, separating the aqueous alcoholic layer solution containing not over 8% of the oil soluble sulphonates, evaporating the aqueous alcoholic solution until an aqueous salt layer is formed having a gravity of about 12° Bé., separating the upper layer and adding thereto a monohydric aliphatic alcohol containing not over 4 carbon atoms in the molecule to obtain an alcohol solution of a concentration between 65 to 80% and containing not over 14% of oil soluble sulphonates dissolved therein, allowing the mixture to settle until the pH of the alcohol layer is below 9.5, separating the upper layer containing the purified soaps and recovering same by evaporating the water and alcohol from the separated alcohol layer to obtain a concentrated oil soluble sulphonate.

FRANCIS M. ARCHIBALD.